United States Patent [19]

Nakamura

[11] Patent Number: 4,679,451
[45] Date of Patent: Jul. 14, 1987

[54] CASE FOR DRIVING SECTION OF LINEAR ACTUATOR

[75] Inventor: Kenichiro Nakamura, Moriyama, Japan

[73] Assignee: Tsubakimoto Chain Co., Osaka, Japan

[21] Appl. No.: 853,947

[22] Filed: Apr. 21, 1986

[30] Foreign Application Priority Data

Jul. 2, 1985 [JP] Japan .................. 60-100072[U]

[51] Int. Cl.$^4$ .................................... F16H 57/02
[52] U.S. Cl. ............................ 74/606 R; 74/424.8 R
[58] Field of Search ............ 74/606 R, 89.15, 424.7, 74/424.8 R; 310/88, 89

[56] References Cited

U.S. PATENT DOCUMENTS

| | | | |
|---|---|---|---|
| 1,397,249 | 11/1921 | Glenn | 310/89 |
| 1,588,009 | 6/1926 | Burks | 74/606 |
| 2,256,870 | 9/1941 | Schaffer | 310/89 |
| 2,813,432 | 11/1957 | Hoskins | 74/606 |
| 2,885,962 | 5/1959 | Campbell | 310/88 |
| 2,910,882 | 11/1959 | Wellauer | 74/606 |
| 3,041,117 | 6/1962 | Ramsey | 310/88 |
| 3,463,951 | 8/1969 | Bauerle et al. | 310/89 |

Primary Examiner—Kenneth J. Dorner
Assistant Examiner—Gerald A. Anderson
Attorney, Agent, or Firm—Howson and Howson

[57] ABSTRACT

A driving section case for a linear actuator comprises a body having a front portion and a rear portion, the front portion having a cylinder assembly protruding therefrom, and the rear portion having an opening providing access to the interior of the body; and a cover closing said opening; the opening having a bottom edge, a top edge, and side edges, the top edge being located forward in relation to the bottom edge, and the side edges being inclined, whereby the opening faces both upwardly and rearwardly; the body having an outer surface surrounding the opening, said outer surface extending both downwardly and forwardly from the location of the opening; and the cover having a flange extending entirely around its periphery and overlying at least the part of said outer surface immediately adjacent to the opening. The flange, in cooperation with the inclined opening of the body, prevents the entry of rain water into the interior of the case in the event of failure of a seal between the cover and the case body. The inclined opening also allows easy access to electrical terminals located near the bottom of the interior of the case body, when the cover is removed.

4 Claims, 4 Drawing Figures

CASE FOR DRIVING SECTION OF LINEAR ACTUATOR

BRIEF SUMMARY OF THE INVENTION

The present invention relates to a case for the driving section of a linear actuator. A typical linear actuator to which the invention applies includes a nut threaded on an electrically-rotated screw shaft. A cylinder, coupled to the nut, is moved back and forth by the rotation of the screw shaft so as to move back and forth a driven body connected to the front end of the cylinder.

In a conventional linear actuator, the movable cylinder is an inner cylinder supported in an outer cylinder secured at the front portion of the body of a case. The outer cylinder is supported in such a way that the inner cylinder can slide axially while being guided. A nut attached to the inner cylinder is threaded on a screw shaft which extends partway through the outer cylinder. The screw shaft is rotated, through speed reduction gears, by an electric motor mounted in the case body, so as to move the inner cylinder back and forth. Electric wires for the electric motor are connected to terminals through a wire hole in the case body. The hole is ordinarily located in the bottom wall of the case body to prevent rain water from leaking into the interior of the case. The terminals are preferably located near the wire hole in the lower portion of the interior of the case body. To provide access to the terminals as well as to other parts within the case body, therefore, conventional practice has been to provide the case body with a rear opening, closeable by a removable cover.

A packing, or both a packing and a sealant, are provided on the meeting faces of the cover and the case body so that the cover can be bolted to the case body in a watertight manner. The meeting faces of the case body and cover are usually vertical and may be exposed to rain water. Consequently, the watertightness of the meeting faces is likely to deteriorate due to insufficient clamping by the bolts, improper application of the sealant, eventual deterioration of the packing and/or the sealant, or other causes. Another problem is that, when the cover is removed, the edge of the opening of the case body hinders electric wire connection work within the case body. Particularly when the electric motor is located in the rear portion of the case body, the space for electric wire connection work is so narrow that it is difficult to perform the work.

One object of the present invention is to provide a driving section case for a linear actuator in which watertightness is ensured. Another object is to provide improved access to the electrical terminals within the driving section case in order to facilitate electrical connection work.

The present invention is characterized in that the edge of the cover-fitted opening of the body of the case is inclined forward in such a way that the top edge of the opening is located in front of the bottom thereof so that the opening faces both rearwardly and upwardly. The cover is provided with a flange for covering the outer edge of the cover-fitted open portion of the case body.

Since the edge of the open portion of the case body is inclined as described above, the flange of the cover overlaps the outer edge of the open portion when the cover is secured to the case body by bolts. Rain water is thus prevented from entering into the case body.

The hole through which wires enter the case is located in the bottom of the case, and the wires are connected to terminals within the case. The forward inclination of the opening of the case providing greatly improved access to the terminals. Since both side edges of the open portion of the case body are inclined forwardly from the bottom edge, the approach of human hands to the terminals is facilitated so as to make it easy to connect the electric wires.

DETAILED DESCRIPTION

Figure 4:
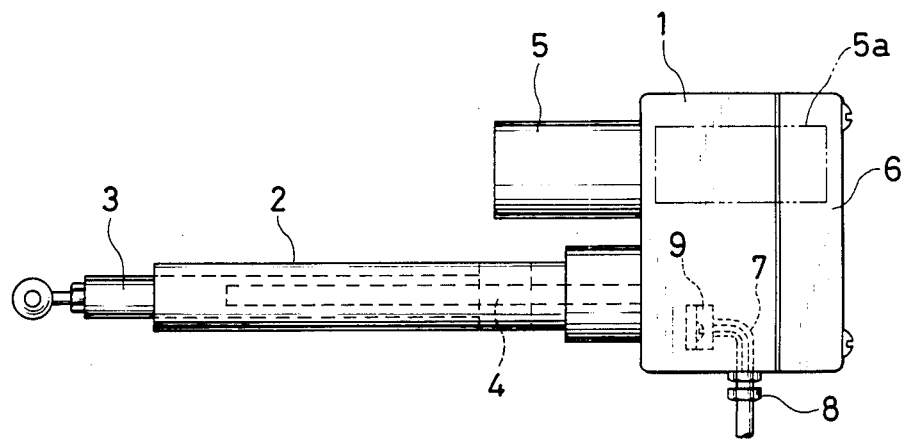
FIG. 4 is a schematic elevation of a conventional linear actuator in accordance with the prior art.

In the conventional actuator of FIG. 4, a movable inner cylinder 3 is supported in an outer cylinder 2 secured at the front portion of the body 1 of the case in such a way that inner cylinder 3 can slide axially while being guided. A nut attached to inner cylinder 3 is threaded on a screw shaft 4, which extends partway through outer cylinder 2. The screw shaft is rotated, through speed reduction gears, by an electric motor 5 mounted on the exterior of the case body 1, so as to move the inner cylinder back and forth. An alternative position of the motor, within the case body, is indicated at 5a. The rear portion of case body 1 is closed by a cover 6. Electric wires 7 for the electric motor are connected to terminals 9 through a hole in the lower portion of the case body 1.

A packing, or both a packing and a sealant, are provided on the meeting faces of the cover 6 and case body 1 so that the cover can be bolted to the case body in a watertight manner.

As pointed out previously, failure of the packing or sealant may allow rain water to enter the interior of the case. Furthermore, the edges of the opening of the case body get in the way of the worker's hands when making connections to the electrical terminals.

Figure 1:
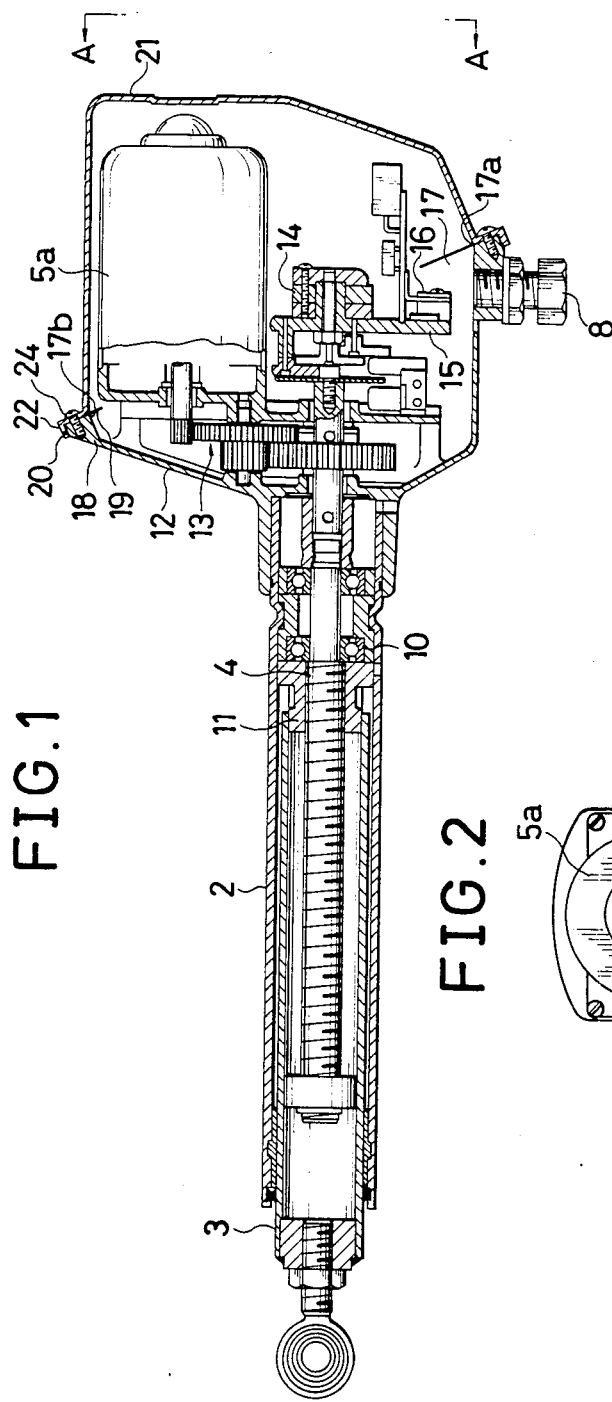
FIG. 1 is a longitudinal section through a linear actuator embodying the present invention.
Figure 2:
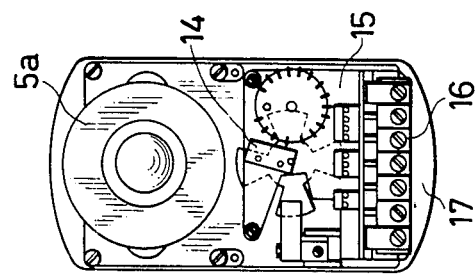
FIG. 2 is an elevational view of the interior of the driving section of the actuator, with the cover removed, as see through plane A—A in FIG. 1.

FIGS. 1 and 2 show a preferred embodiment of the present invention, in which an electric motor 5a, for driving a screw shaft, is mounted within the rear portion of the body of a case. (The parts designated by the same reference numbers in FIGS. 1, 2 and 4 may have the same construction.) The screw shaft 4 is horizontal, and is supported coaxially within an outer cylinder 2 by a bearing 10. A nut 11 threaded on the screw shaft 4 is guided so that it slides in outer cylinder 2 while being prevented from rotating. Nut 11 is fixed to an inner cylinder 3 and moves the inner cylinder in one axial direction or the other depending on the direction of rotation of the screw shaft. The electric motor 5a, mounted within the upper portion of the body 12 of the case, is drivingly coupled to screw shaft 4 through a speed reduction gear train 13. An overload protector 14, mounted on board 15, is provided behind screw shaft 4. Electrical terminals 16 are attached to the lower portion of mounting board 15. Electric wires extend through a hole 8 provided in the case body 12 under terminals 16, and are connected to the terminals.

Figure 3:
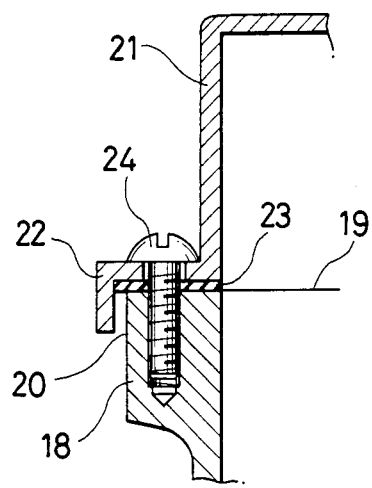
FIG. 3 is a fragmentary section showing the joint of the case body with its cover.

The edge of opening 17 of the case body 12 is inclined forward at an angle within the range of about 20 degrees to 40 degrees from the vertical, so that the opening faces upwardly and rearwardly, and so that the bottom edge 17a of opening 17 is located immediately behind wire hole 8 and the top edge 17b of opening 17 is located in front of the bottom edge 17a and near the front of electric motor 5a. A portion 18 extending around opening 17 of the case body 12, as shown in FIG. 3, includes a face 19 located in a plane containing the edge of the opening 17, and further includes an outer face 20 extending perpendicularly to face 19. A flange 22, formed on a cover 21, has an L-shaped cross-section, with one leg of the L parallel to, and overlying at least part of, face 19, and the other leg parallel to face 20. Flange 22 is fitted with a packing 23 and secured to portion 18 of the case body 12 by screws 24 so as to cover part of outer face 20. Portion 18, extending around opening 17, is therefore partially covered by a part of flange 22 situated at an angle of about 20 degrees to 40 degrees relative to the horizon, so that rain water is completely prevented from entering the interior of the case.

The inclined edge of the opening of the case body not only effectively prevents rain water from entering into the case of the linear actuator during use, but also provides improved access to the electrical terminals within the case.

I claim:

1. A linear actuator comprising: a body having a front portion and a rear portion, the front portion having an outer cylinder protruding therefrom, a screw shaft supported at its rear end in the outer cylinder, a nut threaded on the screw shaft, an inner cylinder secured to the nut and guided and slidable in the outer cylinder while being kept from rotating, and a motor within the body connected to drive the screw shaft, whereby the inner cylinder is movable back and forth into and out of the front end of the outer cylinder by rotation of the screw shaft, the rear portion of the body having an opening providing access to the interior of the body; and a cover closing said opening; the opening having a bottom edge, a top edge, and side edges, the top edge being located forward in relation to the bottom edge, and the side edges being inclined, whereby the opening faces both upwardly and rearwardly; the body having an outer surface surrounding the opening, said outer surface extending both downwardly and forwardly from the location of the opening; and the cover having a flange extending entirely around its periphery and overlying at least the part of said outer surface immediately adjacent to the opening; in which the bottom, top and side edges of the opening lie in a plane; in which the body has a face surrounding said edges, said face also lying in said plane; in which said outer surface is perpendicular to said plane, and in which said flange of the cover comprises a first portion parallel to and overlying said face, and a second portion parallel to and overlying said outer surface.

2. A linear actuator according to claim 1 having sealing means located between said first portion of the flange and said face.

3. A linear actuator according to claim 1 having sealing means located between said first portion of the flange and said face, and fastening mean for securing the cover to the body, said fastening means extending through said first portion of the flange, through said sealing means, and into said face.

4. A driving section case for a linear actuator in which an outer cylinder protrudes from the front portion of the body of a case having an open rear portion covered by a cover; a screw shaft is supported at its rear end in the outer cylinder; an inner cylinder secured to a nut, which is threaded on screw shaft and guided and slidable in the outer cylinder while being kept from rotating, is moved back and forth into and out of the front end of the outer cylinder by the rotation of the screw shaft; an electric motor and a speed reducer for rotating the screw shaft, are mounted in the upper portion of the body of the case; electrical terminals for the motor are located inside the lower portion of the body of the case; and a wire hole for wires leading to the electric motor is provided in the body of the case under the terminals, characterized in that the edge of the open portion of the body of said case is inclined forward toward said screw shaft so that the bottom of said edge is located behind said wire hole and the top of said edge is located in front of the bottom thereof; and said cover is provided with a flange covering the outer face of a portion extending around the open rear portion of the body of the case.

* * * * *